US011035471B2

(12) United States Patent
Nakaniwa et al.

(10) Patent No.: US 11,035,471 B2
(45) Date of Patent: Jun. 15, 2021

(54) SEALING DEVICE AND COMPRESSOR

(71) Applicant: MITSUBISHI HEAVY INDUSTRIES COMPRESSOR CORPORATION, Tokyo (JP)

(72) Inventors: Akihiro Nakaniwa, Tokyo (JP); Daisuke Hirata, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 176 days.

(21) Appl. No.: 16/487,241

(22) PCT Filed: Feb. 22, 2018

(86) PCT No.: PCT/JP2018/006401
§ 371 (c)(1),
(2) Date: Aug. 20, 2019

(87) PCT Pub. No.: WO2018/180053
PCT Pub. Date: Oct. 4, 2018

(65) Prior Publication Data
US 2021/0131568 A1    May 6, 2021

(30) Foreign Application Priority Data
Mar. 30, 2017   (JP) .............................. JP2017-067380

(51) Int. Cl.
*F16J 15/447*        (2006.01)
*F16J 15/40*         (2006.01)
(52) U.S. Cl.
CPC .................................... *F16J 15/40* (2013.01)

(58) Field of Classification Search
CPC ........ F16J 15/40; F16J 15/447; F16J 15/4472; F16J 15/4474; F16J 15/4476;
(Continued)

(56) References Cited

U.S. PATENT DOCUMENTS 5,344,160 A      9/1994  Scarlata et al.
6,000,701 A  *  12/1999  Burgess ................. F16J 15/443
                                                        277/303
(Continued)

FOREIGN PATENT DOCUMENTS

DE      10322027 A1    12/2004
JP      S58-053961 U    4/1983
(Continued)

OTHER PUBLICATIONS

International Search Report and Written Opinion in corresponding International Application PCT/JP2018/006401, dated May 29, 2018 (12 pages).

*Primary Examiner* — Gilbert Y Lee
(74) *Attorney, Agent, or Firm* — Osha Bergman Watanabe & Burton LLP

(57) ABSTRACT

A sealing device includes a ring part, a first fin group that together with a first outer peripheral surface forms a clearance, and a second fin group of which the front end is positioned farther radially inward than the first outer peripheral surface and which together with a second outer peripheral surface forms a clearance. The ring part has a first gas supply channel capable of supplying a first sealing gas to the first fin group, a second gas supply channel capable of supplying a second sealing gas to the second fin group, and a mixed gas discharge channel capable of discharging a mixed gas of the first sealing gas and the second sealing gas from between the first fin group and the second fin group.

9 Claims, 6 Drawing Sheets

(58) Field of Classification Search
CPC ....... F16J 15/4478; F01D 11/02; F01D 11/04; F04D 29/10; F05D 2240/55
See application file for complete search history.

(56) References Cited

U.S. PATENT DOCUMENTS

| | | |
|---|---|---|
| 2013/0149118 A1 | 6/2013 | Lotfi et al. |
| 2014/0037435 A1* | 2/2014 | Porter .................. F01D 11/001 415/173.7 |
| 2016/0130966 A1* | 5/2016 | Shorney ............... F16J 15/4472 277/412 |
| 2016/0341058 A1 | 11/2016 | Nishikawa et al. |

FOREIGN PATENT DOCUMENTS

| | | |
|---|---|---|
| JP | H11-108201 A | 4/1999 |
| JP | 2010-014051 A | 1/2010 |
| JP | 2015-140916 A | 8/2015 |

\* cited by examiner

SEALING DEVICE AND COMPRESSOR

TECHNICAL FIELD

The present invention relates to a sealing device and a compressor.

Priority is claimed on Japanese Patent Application No. 2017-067380, filed on Mar. 30, 2017, the content of which is incorporated herein by reference.

BACKGROUND ART

A sealing device is provided in a compressor so that a gas (process gas) compressed in the compressor does not leak out of a casing (see, for example, Patent Document 1). A dry gas seal is known as a type of such sealing devices.

This sealing device has a first fin group disposed inside the compressor and a second fin group disposed outside the compressor. Each of the first fin group and the second fin group forms a clearance together with the outer peripheral surface of a rotary shaft.

A very small amount of process gas that has passed through a filter is supplied as a sealing gas to the first fin group. An inert gas is supplied as a sealing gas to the second fin group. Formed between the first fin group and the second fin group is a discharge channel discharging a mixed gas of the process gas that has passed through the clearance of the first fin group and the inert gas that has passed through the clearance of the second fin group to the outside as a vent gas.

CITATION LIST

Patent Literature

[Patent Document 1] Japanese Unexamined Utility Model Application, First Publication No. S58-53961

SUMMARY OF INVENTION

Technical Problem

In the above-described sealing device, the process gas that is supplied to the sealing device may pass through the second fin group as a jet flow along the outer peripheral surface of the rotary shaft after passing through the clearance of the first fin group. The jet flow of the process gas leaks to the outside of the compressor by penetrating the second fin group.

The present invention provides a sealing device and a compressor with which sealing gas leakage from an intra-compressor side can be suppressed.

Solution to Problem

A sealing device according to a first aspect of the present invention is a sealing device provided between a rotary shaft and a casing in a compressor having the rotary shaft and the casing surrounding the rotary shaft and separating an intra-compressor side of the compressor and an extra-compressor side of the compressor from each other in an axial direction. The rotary shaft has a first outer peripheral surface, a second outer peripheral surface adjacent to the extra-compressor side with respect to the first outer peripheral surface and smaller in outer diameter than the first outer peripheral surface, and a stepped surface connecting the first outer peripheral surface and the second outer peripheral surface. The sealing device includes a ring part fixed to the casing, surrounding the axis, and having an annular shape, a first fin group including a plurality of fins protruding from an inner peripheral surface of the ring part and forming a clearance together with the first outer peripheral surface, and a second fin group including a plurality of second fins which protrude from the inner peripheral surface of the ring part, of which front ends are positioned farther radially inward than the first outer peripheral surface, and each of which forms a clearance together with the second outer peripheral surface. The ring part includes a first gas supply channel capable of supplying a first sealing gas to the first fin group, a second gas supply channel capable of supplying a second sealing gas to the second fin group, and a mixed gas discharge channel capable of discharging a mixed gas of the first sealing gas that has passed through the clearance formed by the first fin group and the second sealing gas that has passed through the clearance formed by the second fin group, and formed between the first fin group and the second fin group.

According to the above aspect, the first sealing gas passing through the clearance of the first fin group to the extra-compressor side flows toward the second fin along the first outer peripheral surface as a jet flow. The second sealing gas passing through the clearance of the second fin group to the intra-compressor side is bent toward the radially outer side by colliding with the stepped surface, and a vortex is formed in front of the second fin that is on the most intra-compressor side. Accordingly, the jet flow of the first sealing gas flowing toward the second fin is guided toward the radially outer side by the vortex without directly colliding with the second fin. As a result, the jet flow of the first sealing gas is kept away from the clearance of the second fin group toward the radially outer side. In addition, the jet flow of the sealing gas guided radially outward is further guided radially outward along the second fin. As a result, it is possible to suppress the jet flow of the first sealing gas breaking through the clearance of the second fin group.

In the above aspect, a relationship of $CL<W<2D$ may be satisfied in a case where a gap between the stepped surface and the leading second fin in the axial direction is W, the leading second fin being positioned on the most intra-compressor side among the plurality of second fins, a dimension of a clearance between the leading second fin and the second outer peripheral surface is CL, and a radial gap between the second outer peripheral surface and the inner peripheral surface of the ring part where the second fin group is provided is D.

By the relationship being satisfied, the leading second fin is disposed in more proximity to the stepped surface. Accordingly, the jet flow of the first sealing gas easily collides with the second fin. Therefore, in combination with the guidance by the vortex, the jet flow can be kept farther away from the clearance of the second fin group.

In the above aspect, the leading second fin may be inclined toward the intra-compressor side as the leading second fin heads radially inward.

As a result, the jet flow of the first sealing gas colliding with the leading second fin can be more easily guided radially outward along the inclination.

In the above aspect, the ring part includes a wall surface positioned on the extra-compressor side with respect to the first outer peripheral surface and on the intra-compressor side with respect to the leading second fin positioned on the most intra-compressor side among the plurality of second fins, the first sealing gas that has passed through the clearance formed by the first fin group colliding with the wall surface, and the wall surface is inclined toward the extra-compressor side as the wall surface heads radially outward.

In this case, the jet flow of the first sealing gas that has passed through the first fin group collides with the wall surface and is guided radially outward along the wall surface. In addition, the vortex of the second sealing gas is formed on the radially inner side of the wall surface, and thus radially inward entry of the first sealing gas is suppressed. As a result, passage of the jet flow through the clearance of the second fin group can be suppressed.

A compressor according to a second aspect of the present invention includes the rotary shaft, the casing, and the sealing device according to any one of claims 1 to 3.

In the above aspect, the first sealing gas may be a process gas compressed in the compressor and the second sealing gas may be an externally supplied inert gas.

As a result, passage of the process gas through the clearance of the second fin group can be suppressed. Accordingly, management can be more appropriately performed based on process gas leakage suppression even in a case where a process gas needs to be handled with more care, of which examples include a case where a combustible gas or a hazardous gas such as NOX is used as the process gas.

Advantageous Effects of Invention

With the sealing device and the compressor of the present invention, sealing gas leakage from an intra-compressor side can be suppressed.

DESCRIPTION OF EMBODIMENTS

Figure 1:
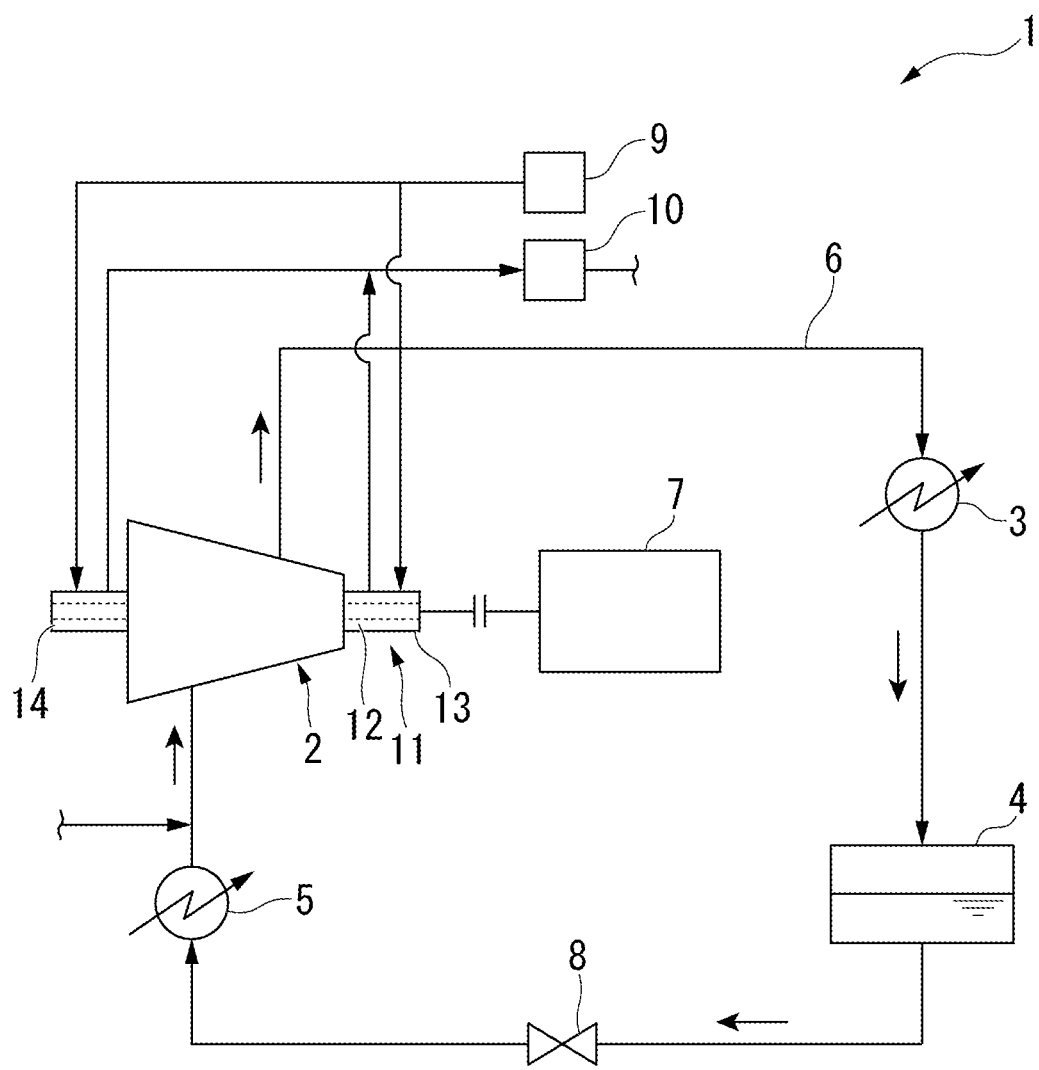
FIG. 1 is a schematic diagram showing a main part of a refrigeration cycle system provided with a compressor according to a first embodiment.

Hereinafter, an example of a system provided with a sealing device and a compressor according to a first embodiment of the present invention will be described in detail with reference to FIGS. 1 to 3. A refrigeration cycle system 1 according to the first embodiment is a system for cooling a cooling object (not shown). The refrigeration cycle system 1 of the present embodiment may be used in, for example, a liquefied natural gas (hereinafter, referred to as LNG) plant. In particular, the refrigeration cycle system 1 may be applied to an LNG plant where natural gas is unearthed from the seabed and liquefied, it is difficult to replenish a process gas G1, and it is difficult to secure a space for adding a refrigerator as a cooling source, of which examples include an offshore plant and a barge-mounted plant.

The refrigeration cycle system 1 is provided with a compressor 2, a condenser 3, a reservoir 4, and an evaporator 5. These configurations are connected by piping 6 in the above order.

The compressor 2 compresses a gaseous refrigerant (hereinafter, referred to as the process gas G1). A driver 7 such as a motor driving a rotor 11 of the compressor 2 is connected to the rotor 11 of the compressor 2.

The condenser 3 cools and condenses the high-temperature and high-pressure process gas G1 compressed in the compressor 2.

The reservoir 4 temporarily stores the process gas G1 turned into a liquid in the condenser 3.

The evaporator 5 evaporates the liquid process gas G1 by heat exchange between a cooling object (not shown) and the liquid process gas G1 supplied in a state where the pressure and the temperature of the process gas G1 are lowered as a result of adiabatic expansion by a valve 8 from the reservoir 4. The process gas G1 vaporized as a result of the evaporation is sent back to the compressor 2.

The process gas G1 is, for example, a hydrocarbon. The hydrocarbon that is used as the process gas G1 may be one type of hydrocarbon or a plurality of types of hydrocarbons appropriately selected from methane, ethane, propane, butane, and the like.

It should be noted that the compressor 2 of the present embodiment may compress a toxic gas such as NOX as well as a combustible gas such as the hydrocarbon as the process gas G1.

Figure 2:
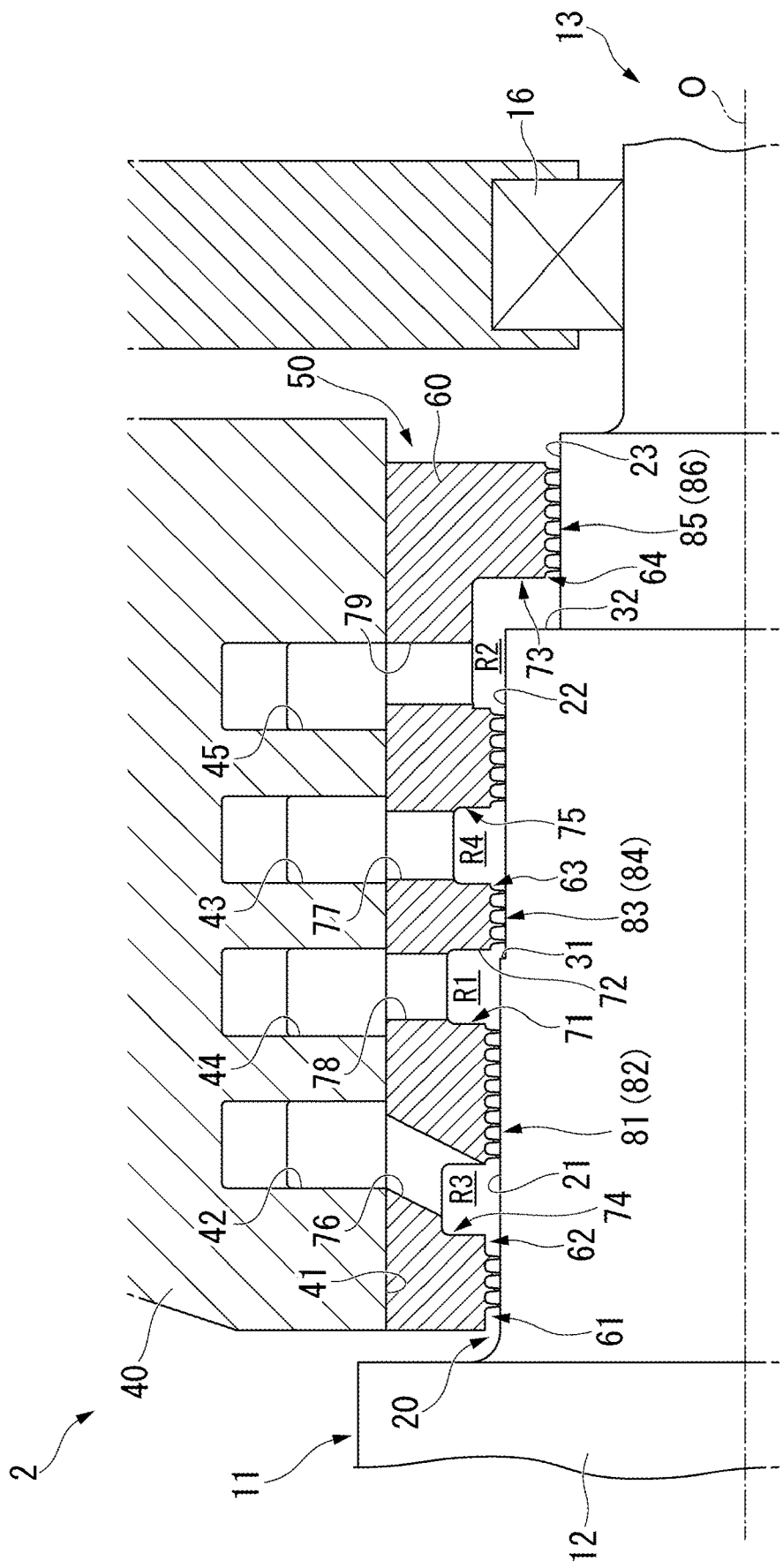
FIG. 2 is a longitudinal sectional view showing a main part of the compressor according to the first embodiment.

As shown in FIGS. 1 and 2, the rotor 11 of the compressor 2 is provided with a rotary shaft 12 rotating around an axis O and an impeller (not shown) attached to the rotary shaft 12. The compressor 2 is provided with a casing 40 accommodating the rotor 11. Both a first end part 13 and a second end part 14, which are both ends of the rotary shaft 12 in the axis O direction, protrude to the outside of the casing 40. The rotary shaft 12 is supported so as to be rotatable with respect to the casing 40 by a bearing 16 outside the casing 40. Although only the first end part 13, which is on one side of the rotary shaft 12 in the axis O direction, is supported with respect to the casing 40 by the bearing 16 in FIG. 2, the second end part 14, which is on the other side of the rotary shaft 12 in the axis O direction, is supported by the bearing 16 as well.

Figure 3:
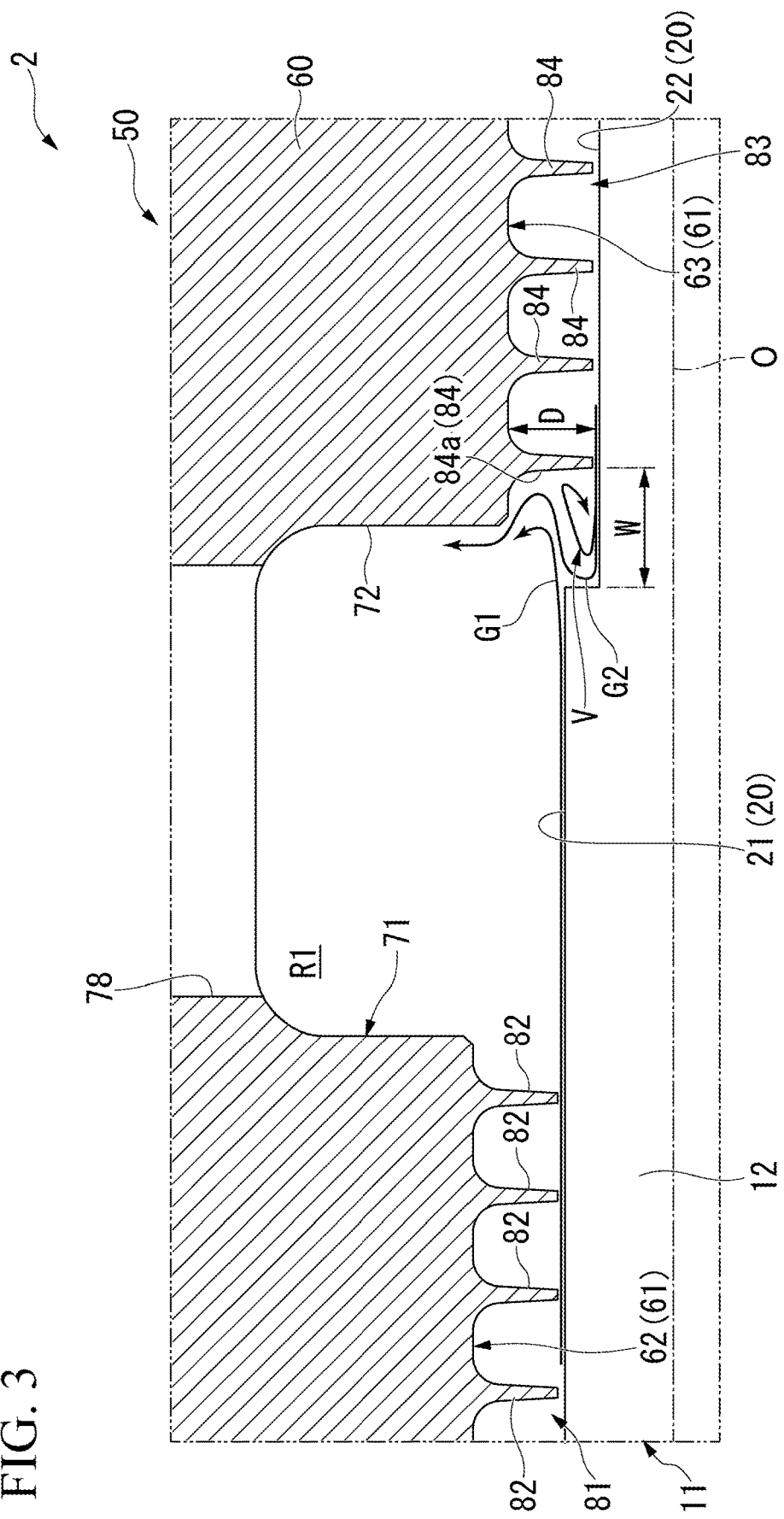
FIG. 3 is a partially enlarged view of FIG. 2.

As shown in FIGS. 2 and 3, a gap is formed between the casing 40 and the part of the rotary shaft 12 that is on the first end part 13 side. A sealing device 50 is provided in the gap. The sealing device 50 suppresses leakage of the process gas G1 as a working fluid in the compressor 2 from the inside of the casing 40 to the outside of the casing 40, that is, from the inside of the compressor 2 (left side in FIG. 2 and the other side in the axis O direction) to the outside of the compressor 2 (right side in FIG. 2 and one side in the axis O direction).

The sealing device 50 is provided so as to surround a first outer peripheral surface 21, a second outer peripheral surface 22, and a third outer peripheral surface 23, which constitute an outer peripheral surface 20 of the rotary shaft 12, from a radially outer side. Each of the first outer peripheral surface 21, the second outer peripheral surface 22, and the third outer peripheral surface 23 has a circular shape in a cross-sectional view orthogonal to the axis O.

The first outer peripheral surface 21 is positioned on the intra-compressor side. The second outer peripheral surface 22 is provided adjacent to the extra-compressor side of the first outer peripheral surface 21. The outer diameter of the second outer peripheral surface 22 is smaller than the outer diameter of the first outer peripheral surface 21. As a result, an annular stepped surface 31 having a planar shape orthogonal to the axis O and facing the extra-compressor side is formed between the first outer peripheral surface 21 and the second outer peripheral surface 22. The third outer peripheral surface 23 is provided adjacent to the extra-compressor side of the second outer peripheral surface 22. The outer diameter of the third outer peripheral surface 23 is smaller than the outer diameter of the second outer peripheral surface 22. As a result, a stepped part 32 is formed between the second outer peripheral surface 22 and the second outer peripheral surface 22.

The sealing device 50 facing the outer peripheral surface of the rotary shaft 12 has a ring part 60, a first fin group 81, a second fin group 83, and a third fin group 85.

The ring part 60 has a cylindrical shape about the axis O. The outer peripheral surface of the ring part 60 has a cylindrical surface shape that has a uniform outer diameter in the axis O direction. The outer peripheral surface of the ring part 60 is integrally fixed to an inner peripheral surface 41 of the casing 40. In other words, the sealing device 50 is fixed to the casing 40.

An inner peripheral surface 61 of the ring part 60 has a first inner peripheral surface 62 facing the first outer peripheral surface 21 of the rotary shaft 12 from the radially outer side, a second inner peripheral surface 63 facing the second outer peripheral surface 22 of the rotary shaft 12 from the radially outer side, and a third inner peripheral surface 64 facing the third outer peripheral surface 23 of the rotary shaft 12 from the radially outer side.

A first discharge recess 71 annularly recessed about the axis O toward the radially outer side is formed between the first inner peripheral surface 62 and the second inner peripheral surface 63 of the ring part 60. A first discharge space R1 is formed so as to be partitioned by the first discharge recess 71 of the ring part 60 and the outer peripheral surface 20 of the rotary shaft 12. The stepped surface 31, which is the boundary between the first outer peripheral surface 21 and the second outer peripheral surface 22 of the outer peripheral surface 20 of the rotary shaft 12, is positioned within the range of the first discharge space R1 in the axis O direction.

Specifically, as shown in FIG. 3, the first discharge recess 71 in the ring part 60 has a wall surface 72 facing the intra-compressor side. The wall surface 72 has a planar shape orthogonal to the axis O. The wall surface 72 extends in an annular shape about the axis O. The wall surface 72 is positioned on the extra-compressor side from the stepped surface 31 of the rotary shaft 12. The radially inner end part of the wall surface 72 is connected to the second inner peripheral surface 63 of the ring part 60 over the entire circumferential direction. The second inner peripheral surface 63 of the ring part 60 faces the second outer peripheral surface 22 of the rotary shaft 12 and is positioned farther radially outward than the first outer peripheral surface 21.

As shown in FIG. 2, a second discharge recess 73 annularly recessed about the axis O toward the radially outer side is formed between the second inner peripheral surface 63 and the third inner peripheral surface 64. A second discharge space R2 is formed so as to be partitioned by the second discharge recess 73 of the ring part 60 and the outer peripheral surface 20 of the rotary shaft 12.

The first outer peripheral surface 21 in the ring part 60 is provided with a first supply recess 74. The first supply recess 74 is formed so as to divide the first outer peripheral surface 21 into two in the axis O direction axially inside both ends of the first outer peripheral surface 21 in the axis O direction. A first supply space R3 is formed so as to be partitioned by the first supply recess 74 of the ring part 60 and the outer peripheral surface 20 (first outer peripheral surface 21) of the rotary shaft 12.

The second outer peripheral surface 22 in the ring part 60 is provided with a second supply recess 75. The second supply recess 75 is formed so as to divide the second outer peripheral surface 22 into two in the axis O direction. In the axis O direction, the second supply recess 75 is formed inside both ends of the second outer peripheral surface 22 in the axis O direction. A second supply space R4 is formed so as to be partitioned by the second supply recess 75 of the ring part 60 and the outer peripheral surface 20 (second outer peripheral surface 22) of the rotary shaft 12.

Here, the ring part 60 is provided with a first gas supply channel 76, a second gas supply channel 77, a mixed gas discharge channel 78, and an inert gas discharge channel 79 (sealing gas discharge channel).

A plurality of the first gas supply channels 76 are formed at circumferential intervals so as to radially penetrate the first supply recess 74 and the outer peripheral surface of the ring part 60.

A first gas introduction channel 42 is formed at the part of the inner peripheral surface 41 of the casing 40 that corresponds to the first gas supply channel 76. The first gas introduction channel 42 is capable of introducing the process gas G1 in the compressor 2 into the first gas supply channel 76 as the process gas G1 for sealing. In other words, part of the process gas G1 to be compressed by the compressor 2 is extracted into the first gas introduction channel 42 and the process gas G1 that has passed through a filter is subsequently supplied.

A plurality of the second gas supply channels 77 are formed at circumferential intervals so as to radially penetrate the second supply recess 75 and the outer peripheral surface of the ring part 60.

A second gas introduction channel 43 is formed at the part of the inner peripheral surface 41 of the casing 40 that corresponds to the second gas supply channel 77. The second gas introduction channel 43 is capable of introducing an inert gas G2 in the compressor 2 into the second gas supply channel 77. As shown in FIG. 1, the inert gas G2 such as nitrogen is supplied to the second gas introduction channel 43 from an inert gas supply source 9 provided outside the compressor 2.

A plurality of the mixed gas discharge channels 78 are formed at circumferential intervals so as to radially penetrate the first discharge recess 71 and the outer peripheral surface of the ring part 60.

A mixed gas lead-out channel 44 is formed at the part of the inner peripheral surface 41 of the casing 40 that corresponds to the mixed gas discharge channel 78. The mixed gas lead-out channel 44 is capable of leading a mixed gas of the process gas G1 and the inert gas G2 to the outside from the mixed gas discharge channel 78. Only the process gas G1 is recovered, by a gas recovery unit 10 shown in FIG. 1, from the mixed gas discharged to the outside of the compressor 2 from the mixed gas lead-out channel 44. The process gas G1 is returned to piping 6 of the refrigeration cycle system 1. The inert gas G2 separated by the gas recovery unit may be released to the atmosphere or may be recovered and reused.

A plurality of the inert gas discharge channels 79 (sealing gas discharge channels) are formed at circumferential intervals so as to radially penetrate the second discharge recess 73 and the outer peripheral surface of the ring part 60.

An inert gas lead-out channel 45 is formed at the part of the inner peripheral surface 41 of the casing 40 that corresponds to the inert gas discharge channel 79. The inert gas lead-out channel 45 discharges the inert gas G2 to the outside from the inert gas discharge channel 79.

The first fin group 81 is provided on the first inner peripheral surface 62 of the ring part 60. A plurality of first fins 82 constitute the first fin group 81. The plurality of first fins 82 protrude radially inward from the first inner peripheral surface 62 and form a clearance together with the first outer peripheral surface 21 of the rotary shaft 12. Each first fin 82 extends in an annular shape about the axis O. The plurality of first fins 82 are arranged side by side at intervals in the axis O direction. The first fin group 81 is divided into two groups in the axis O direction by the first supply recess 74.

The second fin group 83 is provided on the second inner peripheral surface 63 of the ring part 60. The plurality of first fins 82 constitute the second fin group 83. Each second fin 84 extends in an annular shape about the axis O. The second fin group 83 protrudes radially inward from the second inner peripheral surface 63 and forms a clearance together with the second outer peripheral surface 22 of the rotary shaft 12. A plurality of the second fins 84 are arranged side by side at intervals in the axis O direction. The second fin group 83 is divided into two groups in the axis O direction by the second supply recess 75.

Specifically, as shown in FIG. 3, the front ends (radially inner end parts) of the plurality of second fins 84 constituting the second fin group 83 are positioned farther radially inward than the first outer peripheral surface 21.

The third fin group 85 is provided on the third inner peripheral surface 64 of the ring part 60. A plurality of third fins 86 constitute the third fin group 85. The plurality of third fins 86 protrude radially inward from the third inner peripheral surface 64 and form a clearance together with the third outer peripheral surface 23 of the rotary shaft 12. Each third fin 86 extends in an annular shape about the axis O. The plurality of third fins 86 are arranged side by side at intervals in the axis O direction.

Here, as shown in FIG. 3, the axis-O-direction gap between the stepped surface 31 and a leading second fin 84*a*, which is positioned on the most intra-compressor side among the plurality of second fins 84, is W. The dimension of the clearance between the leading second fin 84*a* and the second outer peripheral surface 22 is CL. D is the radial gap between the second outer peripheral surface 22 and the inner peripheral surface of the ring part 60 where the second fin group 83 is provided. In this case, the relationship of $CL<W<2D$ is satisfied in the present embodiment.

Next, the action of the present embodiment will be described.

During operation of the refrigeration cycle system 1, the rotor 11 of the compressor 2 rotates and the sealing device 50 suppresses leakage of the process gas G1 from both ends of the rotor 11 of the compressor 2.

In the sealing device 50, the process gas G1 for sealing from the first gas introduction channel 42 of the casing 40 is introduced into the first supply space R3 via the first gas supply channel 76. The process gas G1 moves from the first supply space R3 to the intra-compressor side and the extra-compressor side through the clearance formed by the first fin group 81. In addition, the inert gas G2 from the second gas introduction channel 43 of the casing 40 is introduced into the second supply space R4 via the second gas supply channel 77. The inert gas G2 moves from the second supply space R4 to the intra-compressor side and the extra-compressor side through the clearance formed by the second fin group 83.

The process gas G1 that has passed through the clearance of the first fin group 81 toward the extra-compressor side and the inert gas G2 that has passed through the clearance of the second fin group 83 toward the intra-compressor side reach the first discharge space R1. In the first discharge space R1, the mixed gas is generated by the process gas G1 and the inert gas G2 being mixed with each other. The mixed gas is discharged from the first discharge space R1 to the outside of the compressor 2 via the mixed gas discharge channel 78 and the mixed gas lead-out channel 44.

The inert gas G2 that has passed through the clearance of the second fin group 83 toward the extra-compressor side reaches the second discharge space R2. The inert gas G2 is discharged from the second discharge space R2 to the outside of the compressor 2 via the inert gas discharge channel 79 and the inert gas lead-out channel 45.

In this manner, in the sealing device 50, leakage of the intra-compressor process gas G1 is suppressed by the process gas G1 for sealing and the inert gas G2 being supplied. In addition, leakage of the process gas G1 for sealing is suppressed by the inert gas G2.

As shown in FIG. 3, in the present embodiment, the process gas G1 passing through the clearance of the first fin group 81 to the extra-compressor side flows toward the second fin group 83 along the first outer peripheral surface 21 as a jet flow. The inert gas G2 passing through the clearance of the second fin group 83 to the intra-compressor side is guided toward the radially outer side by colliding with the stepped surface 31. As a result, a vortex V is formed in front of the leading second fin 84*a*, which is the second fin 84 that is on the most intra-compressor side. The jet flow of the process gas G1 flowing toward the second fin 84 is guided toward the radially outer side by the vortex V. As a result, a direct collision between the jet flow of the process gas G1 and the leading second fin 84*a* is suppressed.

In addition, the vortex V guides the jet flow of the process gas G1 toward the radially outer side away from the clearance of the second fin group 83. The jet flow of the process gas G1 guided radially outward in this manner is further guided radially outward along the second fin 84. As a result, it is possible to suppress the jet flow of the process gas G1 breaking through the clearance of the second fin group 83. Accordingly, it is possible to avoid leakage of the process gas G1 to the outside of the compressor. In the present embodiment, leakage of the process gas G1 is avoided even in a case where the process gas G1 is a combustible gas or a toxic gas such as NOX in particular. Therefore, a safer system can be built. In addition, the process gas G1 can be managed in a more appropriate manner.

Further, in the present embodiment, the relationship of $CL<W<2D$ is satisfied as described above. Accordingly, the leading second fin 84*a* is disposed in more proximity to the stepped surface 31. Therefore, the jet flow of the process gas G1 easily collides with the second fin 84. Therefore, in combination with the guidance by the vortex V, the jet flow can be kept farther away from the clearance of the second fin group 83.

In addition, in the present embodiment, the outer diameter of the second outer peripheral surface 22 on the extra-compressor side is set smaller than the outer diameter of the first outer peripheral surface 21 on the intra-compressor side as for the rotary shaft 12. Correspondingly, the second fin group 83 protrudes farther radially inward than the first fin group 81. Accordingly, the sealing device 50 can be easily attached and detached from the extra-compressor side.

Figure 4:
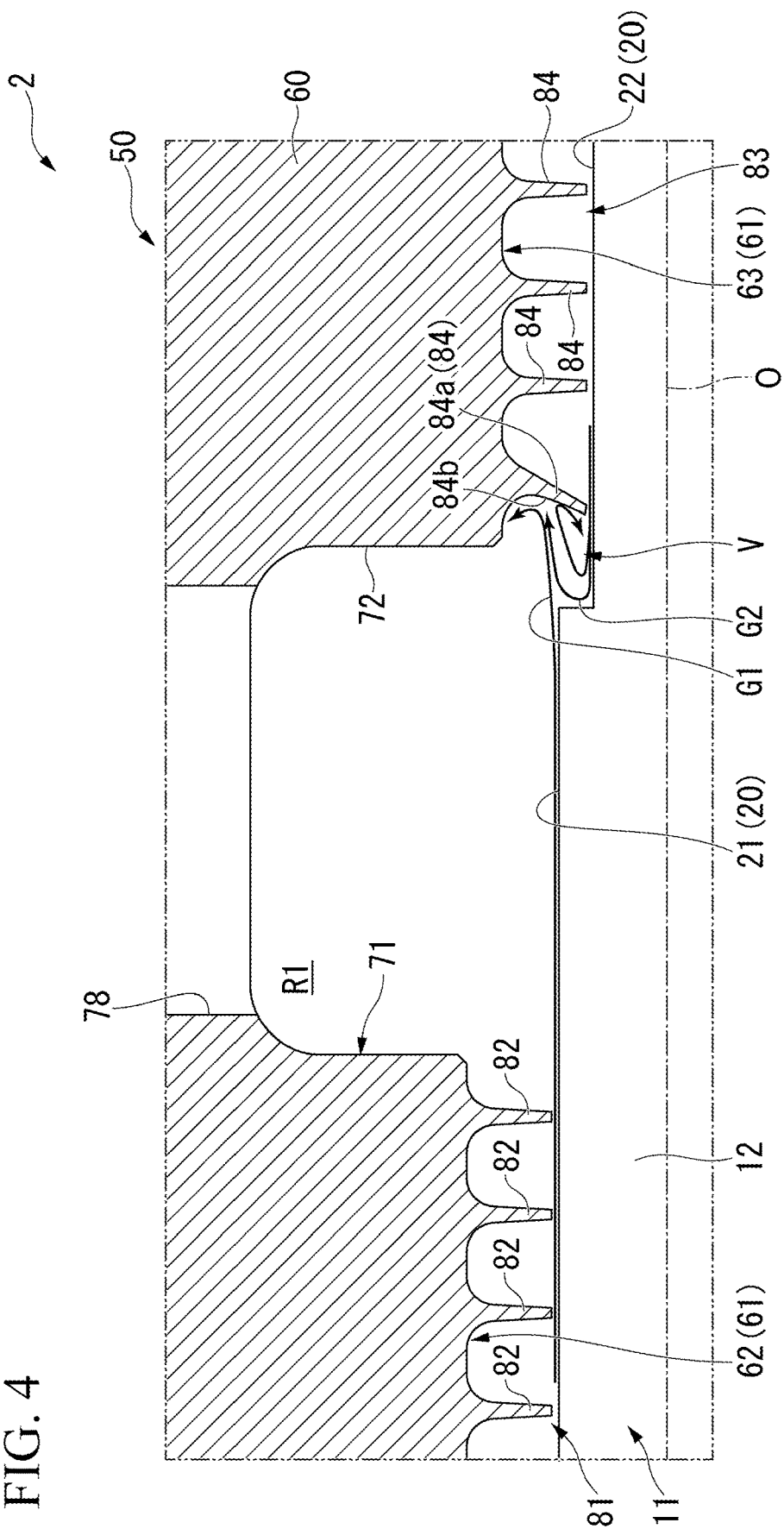
FIG. 4 is a partially enlarged view of a longitudinal sectional view of a compressor according to a second embodiment.

Next, a second embodiment will be described with reference to FIG. 4. Components of the second embodiment similar to those of the first embodiment are denoted by the same reference numerals with detailed descriptions of the components omitted.

In the second embodiment, the leading second fin 84*a*, which is positioned on the most intra-compressor side among the plurality of second fins 84 of the second fin group 83, is inclined toward the intra-compressor side as the leading second fin 84a heads radially inward from the ring part 60. As a result, the surface of the leading second fin 84a that faces the intra-compressor side is an inclined guide surface 84b extending toward the radially outer side as the leading second fin 84a heads toward the extra-compressor side. The plurality of second fins 84 other than the leading second fin 84a radially protrude as in the first embodiment.

As a result of the above configuration of the second embodiment, the jet flow of the process gas G1 is guided radially outward by the vortex V and is further guided radially outward by the inclined guide surface 84b of the leading second fin 84a. In other words, the jet flow of the process gas G1 can be more easily guided toward the radially outer side. Accordingly, it is possible to further suppress the jet flow of the process gas G1 leaking to the outside of the compressor through the second fin group 83.

Figure 5:
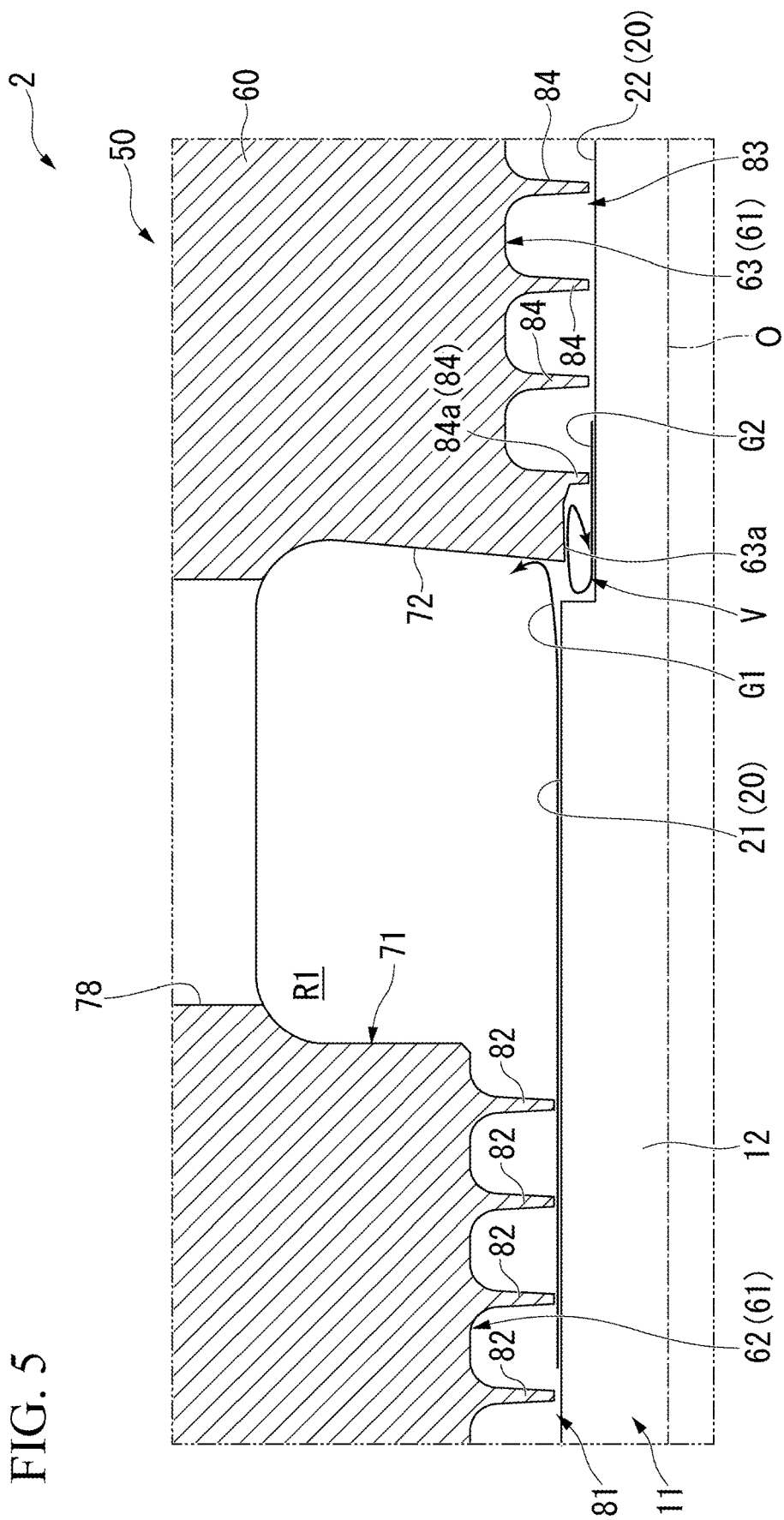
FIG. 5 is a partially enlarged view of a longitudinal sectional view of a compressor according to a third embodiment.

Next, a third embodiment will be described with reference to FIG. 5. Components of the third embodiment similar to those of the first embodiment are denoted by the same reference numerals with detailed descriptions of the components omitted.

In the third embodiment, the part of the second inner peripheral surface 63 of the ring part 60 that is provided with the second fin group 83 and ranges from an intra-compressor side end part to the leading second fin 84a is a protruding inner peripheral surface 63a protruding by one step toward the radially inner side. In addition, the wall surface 72 of the ring part 60 that is connected to the intra-compressor side end part of the second inner peripheral surface 63 extends toward the radially inner side more than in the first embodiment.

In the present embodiment, the protruding inner peripheral surface 63a is positioned at the same radial position as the first outer peripheral surface 21 of the rotary shaft 12 or farther radially inward than the first outer peripheral surface 21 and farther radially outward than the front end of the leading second fin 84a. Accordingly, the radially inner end part of the wall surface 72 is positioned farther radially inward than the first outer peripheral surface 21 from the same radial position as the first outer peripheral surface 21.

Further, the wall surface 72 is inclined toward the extra-compressor side as the wall surface 72 heads radially outward from the radially inner end part. The wall surface 72 is inclined at an inclination angle of, for example, 5° to 15° with respect to the radial direction. The inclination angle of the wall surface 72 is preferably 10°.

According to the present embodiment, the jet flow of the process gas G1 that has passed through the first fin group 81 collides with the wall surface 72 and is guided radially outward along the wall surface 72. In addition, the vortex V of a second sealing gas is formed on the radially inner side of the wall surface 72, and thus radially inward entry of the process gas G1 is suppressed. As a result, it is possible to further suppress the jet flow passing through the clearance of the second fin group 83 and it is possible to effectively suppress leakage of the process gas G1.

Figure 6:
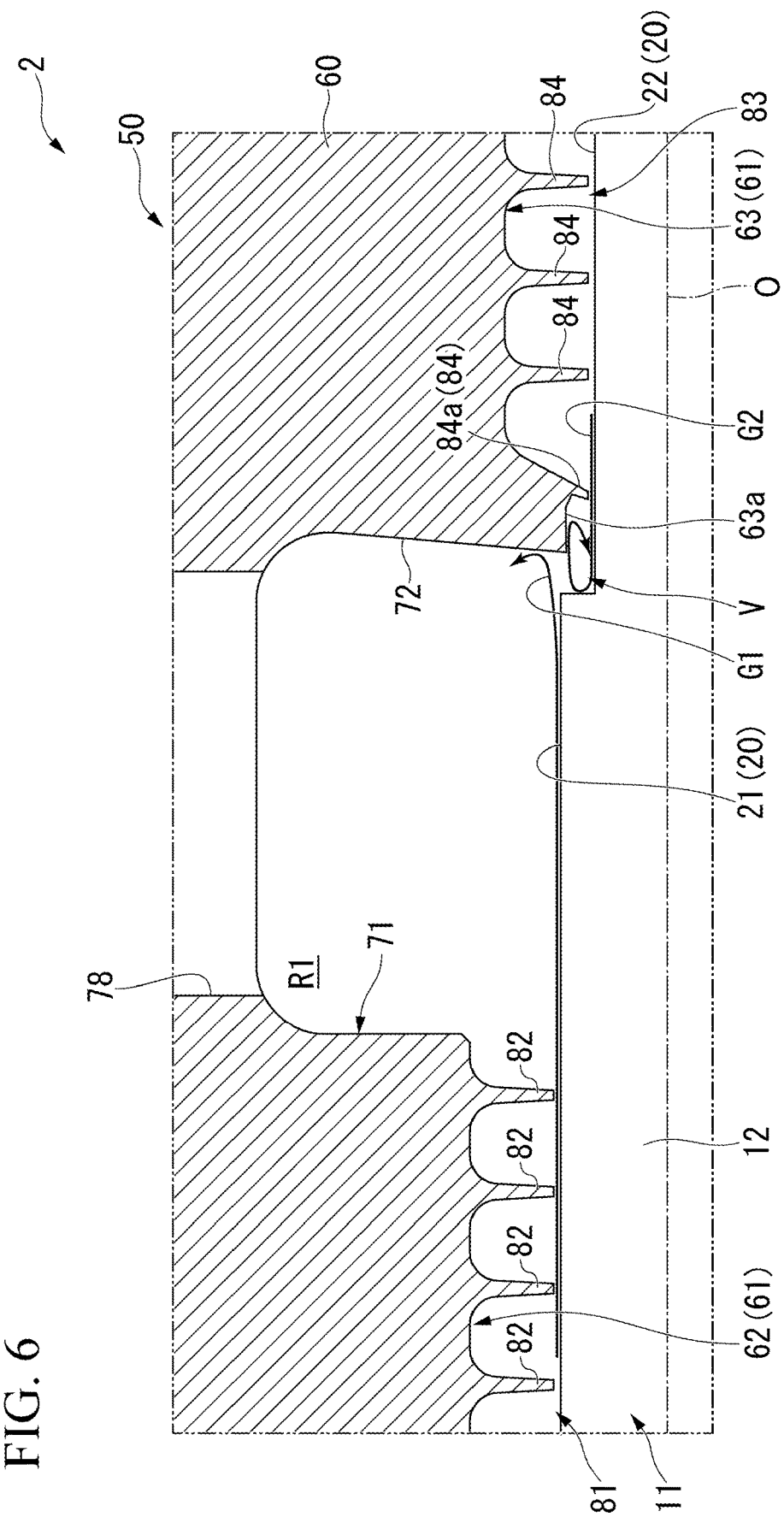
FIG. 6 is a partially enlarged view of a longitudinal sectional view of a compressor according to a modification example of the third embodiment.

It should be noted that the leading second fin 84a may be inclined as in the second embodiment as a modification example of the third embodiment (see, for example, FIG. 6). In this case, the vortex V is more likely to be formed in front of the leading second fin 84a. Accordingly, it is possible to further suppress the jet flow that flows along the first outer peripheral surface 21 entering the second outer peripheral surface 22 side.

Although embodiments of the present invention have been described above, the present invention is not limited to the embodiments. The present invention can be appropriately changed without departing from the technical idea of the invention.

For example, the compressor 2 and the sealing device 50 may be applied to other systems although an example in which the sealing device 50 is applied to the compressor 2 of the refrigeration cycle system 1 has been described in the embodiments.

Although an example in which the process gas G1 is supplied as a first sealing gas to the first fin group 81 has been described in the embodiments, another gas supplied from the outside or the like may be used as the first sealing gas. Leakage of the gas can be effectively suppressed even in a case where the gas is a combustible gas or a toxic gas such as NOX. In addition, a gas other than the above-described gas may be used as the first sealing gas.

The stepped surface 31 is not limited to the planar shape orthogonal to the axis O. The stepped surface 31 may be inclined toward the intra-compressor side or toward the extra-compressor side.

Although an example in which nitrogen is supplied as the second sealing gas to the second fin group 83 has been described in the embodiments, another inert gas G2 may be used as the second sealing gas. In addition, another gas may be used as the second sealing gas without limitation to the inert gas G2.

INDUSTRIAL APPLICABILITY

With the sealing device and the compressor of the present invention, sealing gas leakage from an intra-compressor side can be suppressed.

REFERENCE SIGNS LIST

1 Refrigeration cycle system
2 Compressor
3 Condenser
4 Reservoir
5 Evaporator
6 Piping
7 Driver
8 Valve
9 Inert gas supply source
10 Gas recovery unit
11 Rotor
12 Rotary shaft
13 First end part
14 Second end part
16 Bearing
20 Outer peripheral surface
21 First outer peripheral surface
22 Second outer peripheral surface
23 Third outer peripheral surface
31 Stepped surface
32 Stepped part
40 Casing
41 Inner peripheral surface
42 First gas introduction channel
43 Second gas introduction channel
44 Mixed gas lead-out channel
45 Inert gas lead-out channel
50 Sealing device
60 Ring part
61 Inner peripheral surface 62 First inner peripheral surface
63 Second inner peripheral surface
63a Protruding inner peripheral surface
64 Third inner peripheral surface
71 First discharge recess
72 Wall surface
73 Second discharge recess
74 First supply recess
75 Second supply recess
76 First gas supply channel
77 Second gas supply channel
78 Mixed gas discharge channel
79 Inert gas discharge channel
81 First fin group
82 First fin
83 Second fin group
84 Second fin
84a Leading second fin
84b Inclined guide surface
85 Third fin group
86 Third fin
R1 First discharge space
R2 Second discharge space
R3 First supply space
R4 Second supply space
G1 Process gas
G2 Inert gas
V Vortex
O Axis

What is claimed is:

1. A sealing device provided between a rotary shaft and a casing in a compressor having the rotary shaft rotating around an axis and the casing surrounding the rotary shaft and separating an intra-compressor side of the compressor and an extra-compressor side of the compressor from each other in an axial direction, the rotary shaft having a first outer peripheral surface, a second outer peripheral surface adjacent to the extra-compressor side with respect to the first outer peripheral surface and smaller in outer diameter than the first outer peripheral surface, and a stepped surface connecting the first outer peripheral surface and the second outer peripheral surface, the sealing device comprising:
   a ring part fixed to the casing, surrounding the axis, and having an annular shape;
   a first fin group including a plurality of fins protruding from an inner peripheral surface of the ring part and forming a clearance together with the first outer peripheral surface; and
   a second fin group including a plurality of second fins which protrude from the inner peripheral surface of the ring part, of which front ends are positioned farther radially inward than the first outer peripheral surface, and each of which forms a clearance together with the second outer peripheral surface, wherein
   the ring part includes
      a first gas supply channel capable of supplying a first sealing gas to the first fin group,
      a second gas supply channel capable of supplying a second sealing gas to the second fin group, and
      a mixed gas discharge channel capable of discharging a mixed gas of the first sealing gas that has passed through the clearance formed by the first fin group and the second sealing gas that has passed through the clearance formed by the second fin group, and formed between the first fin group and the second fin group.

2. The sealing device according to claim 1, wherein a relationship of CL<W<2D is satisfied in a case where a gap between the stepped surface and a leading second fin in the axial direction is W, the leading second fin being positioned on a most intra-compressor side among the plurality of second fins, a dimension of a clearance between the leading second fin and the second outer peripheral surface is CL, and a radial gap between the second outer peripheral surface and the inner peripheral surface of the ring part where the second fin group is provided is D.

3. The sealing device according to claim 2, wherein a leading second fin positioned on the most intra-compressor side among the plurality of second fins is inclined toward the intra-compressor side as the leading second fin heads radially inward.

4. The sealing device according to claim 2, wherein
   the ring part includes: a wall surface positioned on the extra-compressor side with respect to the first outer peripheral surface and on the intra-compressor side with respect to a leading second fin positioned on the most intra-compressor side among the plurality of second fins, the first sealing gas that has passed through the clearance formed by the first fin group colliding with the wall surface; and
   the wall surface is inclined toward the extra-compressor side as the wall surface heads radially outward.

5. The sealing device according to claim 1, wherein a leading second fin positioned on the most intra-compressor side among the plurality of second fins is inclined toward the intra-compressor side as the leading second fin heads radially inward.

6. The sealing device according to claim 5, wherein
   the ring part includes: a wall surface positioned on the extra-compressor side with respect to the first outer peripheral surface and on the intra-compressor side with respect to a leading second fin positioned on the most intra-compressor side among the plurality of second fins, the first sealing gas that has passed through the clearance formed by the first fin group colliding with the wall surface; and
   the wall surface is inclined toward the extra-compressor side as the wall surface heads radially outward.

7. The sealing device according to claim 1, wherein
   the ring part includes: a wall surface positioned on the extra-compressor side with respect to the first outer peripheral surface and on the intra-compressor side with respect to a leading second fin positioned on the most intra-compressor side among the plurality of second fins, the first sealing gas that has passed through the clearance formed by the first fin group colliding with the wall surface; and
   the wall surface is inclined toward the extra-compressor side as the wall surface heads radially outward.

8. A compressor comprising:
the rotary shaft;
the casing; and
the sealing device according to claim 1.

9. The compressor according to claim 8, wherein
the first sealing gas is a process gas compressed in the compressor, and
the second sealing gas is an externally supplied inert gas.

* * * * *